May 5, 1925.  
W. B. CLARKSON  
AUTOMATIC ARC WELDING  
Filed July 21, 1924
1,536,774
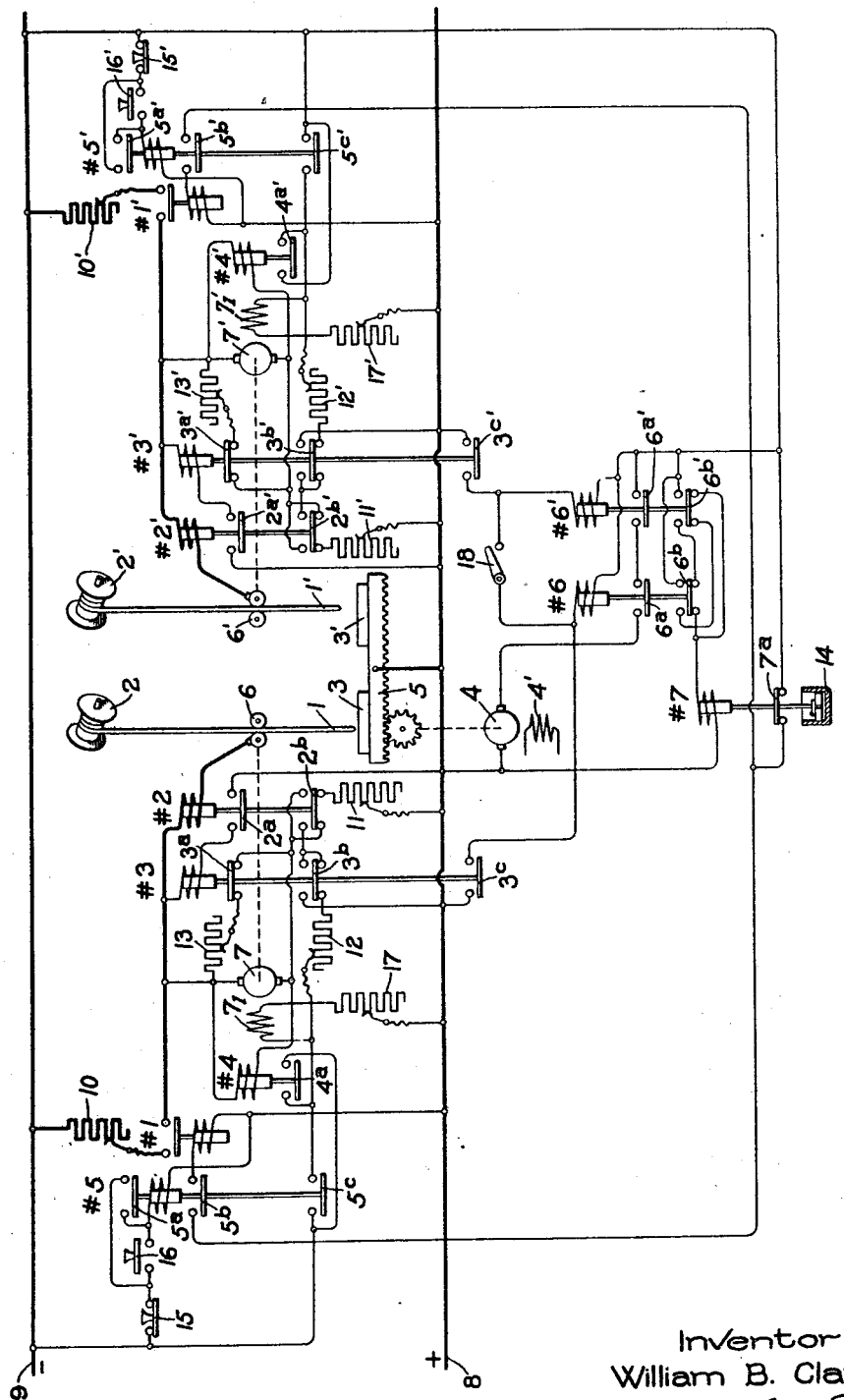
Inventor:  
William B. Clarkson,  
by *Alexander S. Lewis*  
His Attorney.

Patented May 5, 1925.

1,536,774

UNITED STATES PATENT OFFICE.

WILLIAM B. CLARKSON, OF SCHENECTADY, NEW YORK, ASSIGNOR TO GENERAL ELECTRIC COMPANY, A CORPORATION OF NEW YORK.

AUTOMATIC ARC WELDING.

Application filed July 21, 1924. Serial No. 727,146.

*To all whom it may concern:*

Be it known that I, WILLIAM B. CLARKSON, a citizen of the United States, residing at Schenectady, in the county of Schenectady, State of New York, have invented certain new and useful Improvements in Automatic Arc Welding, of which the following is a specification.

My invention relates to electric arc welding and particularly to an improved apparatus and system wherein there are a plurality of welding arcs.

Automatic arc welding systems are now well known in which means are provided for automatically striking the welding arc. In such systems it is common to provide suitable travel means for producing relative movement between the welding arc and the article to be welded which is commonly referred to as the work. Such relative movement is along the line of the seam to be welded. The travel mechanism may comprise an electric motor which is automatically started when the welding arc has been established and which is automatically stopped whenever the arc becomes extinguished. The welding arc is ordinarily maintained between the work and a welding electrode which, in metallic arc welding systems, comprises a metal rod or wire which is fused by the welding current and deposited upon the work. Such a metallic electrode fuses with considerable rapidity and automatic means are now well known for feeding the electrode toward the work to compensate for its consumption and maintain the arc at substantially constant length. Automatic arc welding systems are also now well known in which the electrode is composed of carbon or other substantially non-fusible material. In such systems the electrode wears away much more slowly and the material of the electrode is not intended to be deposited on the work, the work being merely fused by the heat of the arc.

In order to produce the desired relative movement of the arc with respect to the work, it is well known to arrange the travel mechanism so as to move the work with respect to the electrode and it is also common to move the so-called welding head which carried the electrode feeding mechanism so as to move the electrode along the line of the joint while the work remains stationary.

At times it is desirable to use a plurality of arcs and weld two or more seams or weld the same seam at two or more points simultaneously. When making two or more such welds simultaneously, it is advantageous to use but one travel motor and arrange this one motor to produce the desired relative movement between the work and the welding arcs. This motor, as heretofore indicated, may be arranged to move either the work with respect to the welding heads or the welding heads with respect to the work. An object of my invention is to provide an improved arrangement wherein but one such travel motor is used for a plurality of welding arcs and a further object is to provide a system which can also be used for welding with but one arc whenever desired, while maintaining full automatic control of the travel mechanism.

Where but one travel mechanism is used for a plurality of welding arcs, it is apparent that if one arc becomes extinguished and the travel mechanism is not stopped there will be an interruption in the weld at the extinguished arc. On the other hand, if the travel mechanism is stopped whenever but one arc is extinguished the other arc will either deposit and pile up metal at one spot or burn a hole through the work. In either case the welding is defective and the operation undesirable. In accordance with my invention serious defects in the welds from these causes are obviated.

My invention will be better understood from the following description taken in connection with the accompanying drawing, and its scope will be pointed out in the appended claims.

The drawing diagrammatically represents a welding system embodying my invention.

Referring to the drawing, the welding electrodes 1 and 1' are shown as metallic electrodes drawn from reels 2 and 2'. The work to be welded is represented at 3 and 3'. In order to produce relative motion of the welding arcs along the seams to be welded, a single motor 4 is conventionally illustrated as geared to a support 5 upon which the work to be welded is placed. It will be understood that any suitable travel mechanism may be used and that such mechanism, as heretofore indicated, may either move the work with respect to the electrodes, as shown, or move the electrodes with respect to the work. It will also be understood that it is immaterial, as far as my invention is concerned, whether the seams to be welded are located one behind the other or side by side and that it is immaterial whether the seams to be welded are in the same article or in different articles.

While my invention in its broader aspects is not limited to any particular means for automatically striking and maintaining the welding arcs, it is necessary to describe one suitable system to enable my invention to be understood. The arrangement which I have illustrated for automatically striking and maintaining each welding arc is the same for each arch and it will therefore be necessary to describe in detail the arrangement for one arc only.

The mechanism for feeding the electrode 1 is shown as comprising feed rolls 6 driven by suitable gearing, which it is not necessary to illustrate, from the motor 7. The corresponding elements for the other arc are indicated by the same numbers primed. Welding current is represented as supplied from the constant voltage mains 8 and 9. The work is shown as connected to the positive main 8 and the negative main 9 is connected to the electrode 1 through the usual stabilizing resistor 10. The welding circuit leads through a circuit controlling means shown as a contactor #1 and thence through the series operating coil of contactor #2 to the electrode. The electrode feed motor 7 operates, when the contactor #1 is closed, to feed the electrode 1 into engagement with the work 3. The motor 7 then reverses and withdraws the electrode from the work to establish the welding arc. After such arc has been established the motor 7 again reverses and feeds the electrode toward the work to maintain the arc length substantially constant. This operation of the electrode feed motor is brought about by the series contactor #2 and a shunt contactor #3. The circuits which bring about this operation will be briefly traced before describing the cooperation of my present invention therewith. Assuming that contactor #1 is closed a circuit is completed for the armature of the electrode feed motor 7 from the main 8 through the resistor 11, the lower contacts 2$^b$ of contactor #2, up through the motor armature and through contactor #1 and resistor 10 to the main 9. The field 7 of the electrode feed motor is excited during this operation from any suitable source. As soon as the electrode 1 touches the work, current flows through the operating coil of contactor #2 and lifts this contactor to its upper position. Contact 2$^a$ of contactor #2 completes the circuit of the operating coil of contactor #3 connecting this coil between the work and the electrode so that when the arc is drawn this contactor is energized by the arc voltage. When the electrode 1 engages the work 3, the electrode is said to be short circuited upon the work and the voltage drop at the point of contact is very low and insufficient to operate contactor #3. The current which flows in the welding circuit is limited by the resistor 10 and practically the full line voltage appears across this resistor. Current at this time flows through the electrode feed motor 7 in the opposite direction to that heretofore traced; namely, down through the motor armature through the contact 2$^b$ of contactor #2, which is now in its upper position and through the contact 3$^b$ of contactor #3 which is still in its lower position, through the resistor 12 to the main 9.

The electrode feed motor is thus reversed to strike the arc. In order to secure a steady operation of the electrode feed motor during the feeding of the electrode into contact with the work a resistor 13 is maintained in shunt to the armature of the feed motor by means of contact 3$^a$ on contactor #3. As the electrode 1 is withdrawn from the work to establish the arc, the voltage across the arc increases in proportion to the length of the arc. When a predetermined arc voltage has been reached, contactor #3 picks up to reverse again the current through the electrode feed motor and connect the motor directly across the arc. The circuit leads from the main 8, which is connected to the work, through the contact 3$^b$ of contactor #3, which is now in its upper position, contact 2$^b$ of contactor #2, which is also now in its upper position, and up through the feed motor armature. Contact 3$^a$ of contactor #3 is now open so that resistor 13 is no longer in shunt to the motor armature. The motor will now operate to maintain the arc at substantially constant length since any increase in arc length is accompanied by an increase in voltage which causes the electrode feed motor to run faster and any decrease in arc length is accompanied by a decease in voltage which causes the electrode feed motor to run more slowly, as is well known in the art.

If, while welding, the arc becomes extinguished by the electrode 1 touching the work 3, contactor #3 will be deenergized and drop out thus completing the circuit heretofore traced for reversing the current through the electrode feed motor armature to withdraw the electrode from the work and restrike the arc. If, during welding, the arc at any time becomes extinguished by open circuiting, the welding current ceases to flow and contactor #2 is deenergized and drops out. The dropping out of this contactor opens contact 2ª thus deenergizing contactor #3 also. Both contactors #2 and #3 therefore drop to their lower positions and the electrode feed motor operates in a direction to feed the electrode into contact with the work to reestablish the arc just as it was established at the beginning of the welding operation.

As heretofore indicated, the operation of the series contactor #2' and the shunt contactor #3' for the other arc shown is exactly the same as for the first arc. While I have shown but two welding arcs, it is to be understood that any desired number may be used.

Contactors #3 and #3' are thus respectively responsive to the electrical condition of each arc. Whenever either arc is extinguished by either short circuiting or open circuiting the corresponding contactor is deenergized and drops to its lower position. During normal operation of any arc, the corresponding contactor is maintained in its upper position. In the embodiment of my invention illustrated these contactors #3 and #3' are used for controlling the operation of the travel motor 4. The operating circuit of the travel motor is arranged so that it is completed only when both contactors #3 and #3' are energized. The circuit of the travel motor is open when both contactors are deenergized and is also open when one of the contactors is deenergized although the other remains energized. To accomplish this result I provide a contact 3ᶜ on contactor #3 and a contact 3ᶜ' on the contactor #3'. While these contacts 3ᶜ and 3ᶜ' might be arranged to control the circuit of the travel motor directly or indirectly by means of electrically operated switches such as reversing contactors one of which is previously selected for the desired direction of operation by means of a switch, I prefer to control such circuit by means of relays #6 and #6' respectively controlled by the contacts 3ᶜ and 3ᶜ'. When contactor #3 picks up, contact 3ᶜ completes a circuit from the main 8 through the operating coil of relay #6 to the main 9. Contact 3ᶜ' similarly controls the circuit of relay #6'. The circuit of the armature of the travel motor 4 is controlled by contacts 6ᵃ and 6ᵃ' on relays #6 and #6' respectively. It is apparent that the circuit of the travel motor is completed only when contacts 6ᵃ and 6ᵃ' are both closed, that is, only during the time that both welding arcs are in operation. If either arc fails the corresponding #3 contactor drops out, thus deenergizing the corresponding #6 relay, opening the circuit of the travel motor armature. The travel motor thus remains inoperative until both welding arcs have been established and stops when either arc becomes extinguished from any cause. Suitable means may be provided for bringing the travel motor instantly to a stop as soon as its circuit is opened so that the inertia of the travel motor will not move the work after an arc becomes extinguished. Such means for braking the travel motor are now well known in the art and form no part of my invention. The field winding for the travel motor is indicated at 4' and this winding may be continuously energized from any suitable source.

From the foregoing description, it will be apparent that I have provided means responsive to the electrical condition of each arc for controlling the operation of the travel mechanism, arranged to set the travel mechanism into operation when all of the arcs have been established and to stop the travel mechanism when any arc becomes extinguished. From the foregoing description it will also be apparent that when any arc becomes extinguished from any cause the electrode feed motor 7 or 7' immediately endeavors to restrike the arc. If the arc is restruck promptly, the travel motor is again set into operation. I provide means for interrupting the flow of welding current to all of the arcs if the extinguished arc is for some reason not restruck promptly so that the continued operation of the other arcs will not continue to pile up metal on the work or burn the work. In the embodiment of the invention illustrated this interruption of the welding current is accomplished by a relay #7 which is retarded in its operation so that the welding circuits will not be interrupted until the expiration of an interval sufficient to permit the restriking of the extinguished arc when the restriking mechanism operates normally. In the drawing, relay #7 is provided with a contact 7ª which is in series with the operating coils of the main contactors #1 and #1'. The retarded operation of relay #7 is diagrammatically indicated in the drawing by the dashpot 14, although it will be understood that any means known to the art may be provided for securing the delayed operation of the relay. The circuit of the operating coil of the relay #7 is controlled in response to the electrical condition of each arc by means of contactors #3 and #3', which, in the embodiment illustrated, provide this control through the relays #6 and #6'. Relay #6 is provided with a contact 6ᵇ and relay #6' is provided with a contact 6ᵇ'. These contacts 6ᵇ and 6ᵇ' are interconnected with the operating coil of relay #7 so that the circuit of this operating coil is opened when relays #6 and #6' are both down and is also opened when relays #6 and #6' are both up. When, however, either relay #6 or #6' is up while the other is down the circuit of the operating coil of relay #7 is completed. For example, if the arc between the electrode 1 and the work 3 becomes extinguished, the dropping out of contactor #3 deenergizes relay #6, which, in addition to opening the circuit of the travel motor at the contact 6ᵃ, as above described, also completes a circuit through the contacts 6ᵇ in its lower position. If it be assumed that the other arc remains established, contactor #3′ remains up and relay #6′ remains up so that contact 6ᵇ′ is in its upper position. The circuit through the operating coil of relay #7 is thus completed from main 8, through contacts 6ᵇ and 6ᵇ′ to the main 9. It will also be apparent that if relay #6′ were in its lower position, while relay #6 were in its upper position as would be the case if the arc between the electrode 1′ and the work 3′ were extinguished while that between the electrode 1 and work 3 remained established, the circuit through the operating coil of relay #7 would also be completed. This retarded relay #7 is, therefore, energized to open the contacts 7ᵃ whenever any arc is extinguished from any cause while another arc remains established, but, as heretofore stated, contact 7ᵃ does not cause the opening of the various welding circuits until sufficient time has elapsed to permit the normal operation of the arc restriking mechanism for the extinguished arc.

The foregoing description began with the assumption that contactors #1 and #1′ were closed at the beginning of the welding operation, but to simplify the description, the circuits for closing these contactors were not described. Such circuits will now be described and, since the circuits are the same for each welding arc, the description may be confined to the control for contactor #1. The circuit of the operating coil of contactor #1 is controlled by a contactor #5 controlled by push buttons or other switches 15 and 16. Push button 15 is a normally closed push button, while 16 is a normally open push button. To begin welding the operator closes push button 16 thus completing a circuit across the mains 8 and 9 through the push buttons 15 and 16 and the operating coil of contactor #5. The picking up of contactor #5 closes a contact 5ᵃ which short circuits the push button 16 so that contactor #5 remains energized even though the push button 16 be released and allowed to move to its open position. Contact 5ᵇ of contactor #5 closes a circuit for the operating coil of contactor #1, from the main 8, through the coil, through contact 5ᵇ and contact 7ᵃ of relay #7 to the main 9. Contactor #1, therefore, closes. Contactor #5 is also provided with a contact 5ᶜ which completes the circuit of the field winding 7′ of the electrode feed motor 7 through the resistor 17.

From the foregoing description of the control circuits it will be apparent that to start welding the operator closes the corresponding push buttons 16 for each welding arc and these push buttons may be arranged in any desired location for convenient access. The apparatus then automatically strikes each welding arc, as heretofore described, and, as soon as all of the arcs have been established, the travel motor is set into operation, as heretofore described, for producing relative movement between the arcs and the work to be welded. If one arc becomes extinguished and fails to restrike within the desired predetermined interval, relay #7 opens contact 7ᵃ thus opening contactors #1 and #1′ and thus interrupting the flow of welding current to all of the arcs. Contactors #5 and #5′, however, remain energized, thus keeping the contacts 5ᵇ and 5ᵇ′ closed. As soon as the welding current is interrupted for both of the arcs both contactors #3 and #3′ are deenergized thus deenergizing both relays #6 and #6′ so that these relays are both in their lower position thereby opening the circuit of the operating coil of relay #7. Relay #7, therefore, again closes the contacts 7ᵃ thereby again energizing the operating coils of contactors #1 and #1′ so that the automatic arc striking mechanism again endeavors to strike each arc. If the arcs all restrike at this time, the travel motor is set into operation and welding proceeds. If, however, one of the arcs still fails to restrike within the predetermined desired interval, relay #7 again causes the interruption of the various welding circuits. Relay #7 may be constructed as a notching relay, if desired, so that it will break and make the circuit a predetermined number of times, after which it will maintain the circuit open. The relay may thus be arranged to leave the welding circuits open after one, two or more operations. If it is arranged to lock open after but one operation, it is apparent that welding will be stopped when any arc becomes extinguished and fails to restrike within the desired time interval, and the apparatus will remain out of operation until the operator remedies the trouble and resets relay #7 to its normally closed position.

It is apparent that contactors #5 might be omitted and the circuit of the operating coils of contactors #1 controlled directly by a push button or other control. I prefer to use contactor #5 for the reason that if at any time during welding the voltage should fail on the mains 8 and 9, contactor #5 would drop out thereby opening the welding circuits in such a way that they would not be automatically reclosed upon the reappearance of voltage upon the mains. Contactor #5 gives what is commonly called no voltage protection. After a failure of the line voltage, welding can be initiated only by again operating the starting push buttons.

In the control system shown, a relay #4 is illustrated, the operating coil of which is connected across the armature of the feed motor. This relay is provided with a contact 4ᵃ which when closed shunts the contact 5ᶜ of contactor #5. Relay #4, therefore, maintains the circuit of the field winding 7, of the electrode feed motor completed as long as relay #4 is energized, notwithstanding the fact that contact 5ᶜ may have opened. Relay #4 being in shunt to the armature of the electrode feed motor remains energized as long as the armature is turning and becomes deenergized when the motor stops. The function of this relay is to prevent coasting of the electrode feed motor whenever the welding circuit is opened. As heretofore described, the resistor 13 is connected in shunt to the armature of the feed motor whenever contactor #3 is deenergized and, since relay #4 maintains the field on the feed motor as long as the motor is turning, there is a strong dynamic braking action which brings the motor to a quick stop and prevents the inertia of the parts from coasting and jamming the electrode against the work. This arrangement of relay #4 is disclosed and claimed in my copending application, Serial No. 682,341 filed December 22, 1923, for automatic arc welding control systems and assigned to the same assignee as the present application.

It is apparent from the foregoing description that the circuit of the travel motor 4 is controlled by the conjoint action of contactors #3 and #3', which are respectively responsive to the condition of each arc and that relay #7 is also controlled by such conjoint action. In accordance with my invention I have arranged the apparatus so that if desired the conjoint action of the contactors may be removed and any one arc used alone for welding while still maintaining full automatic control of the travel motor to start the motor into operation when the welding arc is established and stop the motor whenever the arc fails either by open circuiting or short circuiting. This may be accomplished in various ways without departing from my invention. In the embodiment illustrated I have provided a switch 18 which when closed will cause the energization of either #3 or #3' contactor to pick up both relays #6 and #6' instead of only one as heretofore described. For example, if switch 18 is closed and the operator closes push button 16 for but one of the welding arcs, such arc will be automatically struck as heretofore described and upon the establishment of a predetermined arc voltage #3 contactor will close its contact 3ᶜ thereby completing the circuit of the operating coil of relay #6 as heretofore described and at the same time completing a circuit through the switch 18 to the operating coil of relay #6'. Both relays #6 and #6' will, therefore, pick up and contacts 6ᵃ and 6ᵃ' will both close thus setting the travel motor into operation. If the welding arc becomes extinguished from any cause contactor #3 will drop out and contact 3ᶜ thereof will deenergize both relays #6 and #6' and the relays will both drop to their lower positions. In this case one of the relays #6 can never be energized while the other is deenergized and the operating coil of relay #7 will, therefore, always remain open and there will be no operation of relay #7 to open the welding circuit. It is thus seen that I have arranged the apparatus and control circuits so that, while the desired conjoint operation may be secured, independent welding by either welding circuit can also be secured without reorganizing the apparatus or changing the permanent connections in any way.

While I have illustrated and described particular means for automatically feeding the electrodes to maintain the welding arcs and particular means for automatically striking the various arcs, it is to be understood that my invention is not limited to such means since any desired arc striking means may be used and any desired means for maintaining the welding arcs. It is merely essential that means be provided responsive to the electrical condition of each arc which will operate in the desired manner. It will also be apparent to those skilled in the art that many changes and modifications may be made in the arrangement of circuits and devices for controlling the travel mechanism and for establishing and interrupting the flow of welding current without departing from my invention and I therefore aim in the appended claims to cover all such variations and modifications as fall within the true spirit of my invention.

What I claim as new and desire to secure by Letters Patent of the United States is:—

1. An arc welding apparatus of the type wherein there are a plurality of arcs and electrode feeding mechanism for maintaining each arc and wherein a single travel mechanism is provided for producing relative motion between said arcs and the work to be welded, characterized by the fact that means responsive to the condition of each arc is provided for controlling the operation of said travel mechanism arranged to cause operation of the travel mechanism during such time only as all of said arcs are in operation.

2. An arc welding system of the type comprising a plurality of arcs, electrode feeding mechanism for maintaining each arc, a motor device for simultaneously producing relative motion between each of said arcs and the work to be welded, and means respectively responsive to the voltage across each arc conjointly controlling the operation of said motor device.

3. In an arc welding apparatus of the type wherein there are a plurality of arcs and wherein means are provided for automatically striking and maintaining each arc and wherein travel means are provided for producing simultaneous relative movement between each arc and the work to be welded, the combination of means respectively responsive to the electrical condition of each arc arranged to set said travel means into operation when all of said arcs have been established and to stop said travel means when any arc fails.

4. An arc welding system comprising a plurality of arcs, means for automatically striking each arc, travel means for producing relative movement between each arc and the work to be welded, means responsive to the electrical condition of each arc for controlling the operation of said travel means, and means responsive to the electrical condition of each arc arranged to interrupt the flow of welding current through all of the arcs in the event that any arc becomes extinguished and fails to be reestablished within a predetermined time interval.

5. An arc welding apparatus comprising a plurality of electrodes between each of which and the work to be welded an arc is adapted to be struck and maintained, travel means for producing relative movement between each of said arcs and the work to be welded, a circuit adapted to carry welding current to each arc, electroresponsive devices responsive to the voltage of each arc, relays for controlling the operation of said travel means respectively controlled by said electro-responsive devices and arranged to cause operation of the travel means only while all of the arcs are established and a retarded relay controlled by said relays arranged to control said welding circuits.

6. An arc welding system comprising a plurality of arcs, a welding circuit for carrying the welding current of each arc, circuit controlling means for each welding circuit, a retarded relay for controlling all of said circuit controlling means, and means responsive to the electrical condition of each arc arranged to cause operation of said retarded relay when one arc is extinguished while the other arc or arcs remain established whereby the failure of one arc causes all of said welding circuits to be opened after an interval determined by the setting of said retarded relay.

7. An arc welding apparatus comprising a plurality of arcs each of which is maintained between the work to be welded and a metallic electrode, contactors for controlling the flow of welding current through each arc, means for automatically striking each arc, a travel motor for producing relative motion between each arc and the work to be welded, means responsive to the electrical condition of each arc arranged to complete an operating circuit to the travel motor when all of the arcs are established and to interrupt the circuit of the travel motor whenever any arc is extinguished while another arc remains established and whenever all of the arcs are extinguished, a relay for controlling said contactors, and means for completing the circuit of said relay whenever one arc becomes extinguished while another arc remains established, to open said contactors after an interval greater than that normally required for said arc striking means to operate, said relay being connected so as to be deenergized when said contactors open and arranged when deenergized to permit said contactors to reclose.

8. An arc welding system comprising a plurality of arcs adapted to be operated simultaneously, a welding circuit for each arc, a single travel motor adapted to produce relative motion between each arc and the work to be welded, means respectively responsive to the electrical condition of each are arranged by conjoint action to complete the circuit of said travel motor when both arcs are established and to interrupt the circuit of said travel motor when both arcs are extinguished and also when any arc is extinguished while another arc remains established, and switching means adapted to be operated to permit one of said arc-condition-responsive means to complete the circuit of said travel motor independently of other arc-condition-responsive means whereby one arc alone may be operated and the corresponding electro-responsive means may control the operation of the travel motor to start the same when the arc is established and stop the same when the arc is extinguished.

9. An arc welding system as claimed in claim 8 comprising means for interrupting said welding circuits whenever one arc is extinguished for a predetermined interval while another arc remains established, said switching means being arranged to render said means for interrupting said welding circuits inoperative while welding with but one arc.

In witness whereof, I have hereunto set my hand this 18th day of July, 1924.

WILLIAM B. CLARKSON.